United States Patent
Wang et al.

(10) Patent No.: US 9,886,158 B2
(45) Date of Patent: Feb. 6, 2018

(54) IN-CELL ELECTROMAGNETIC TOUCH DISPLAY PANEL AND DISPLAY DEVICE

(71) Applicant: BOE Technology Group Co., Ltd., Beijing (CN)

(72) Inventors: Xinxing Wang, Beijing (CN); Guangkui Qin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 169 days.

(21) Appl. No.: 14/761,468

(22) PCT Filed: Oct. 16, 2014

(86) PCT No.: PCT/CN2014/088703
§ 371 (c)(1),
(2) Date: Jul. 16, 2015

(87) PCT Pub. No.: WO2016/015384
PCT Pub. Date: Feb. 4, 2016

(65) Prior Publication Data
US 2016/0109988 A1 Apr. 21, 2016

(30) Foreign Application Priority Data

Jul. 30, 2014 (CN) .......................... 2014 1 0371517

(51) Int. Cl.
*G06F 3/041* (2006.01)
*G06F 3/046* (2006.01)
*G06F 3/0354* (2013.01)

(52) U.S. Cl.
CPC .......... *G06F 3/046* (2013.01); *G06F 3/03545* (2013.01); *G06F 3/0412* (2013.01); *G06F 3/0416* (2013.01)

(58) Field of Classification Search
CPC ...... G06F 3/046; G06F 3/0412; G06F 3/0416; G06F 3/03545
See application file for complete search history.

(56) References Cited

U.S. PATENT DOCUMENTS

2008/0303774 A1* 12/2008 Yoshinaga ............ G06F 3/0412
345/98
2012/0092577 A1* 4/2012 Shi ...................... G02F 1/13338
349/43

(Continued)

FOREIGN PATENT DOCUMENTS

CN 103092446 A 5/2013
CN 103927071 * 7/2014

(Continued)

OTHER PUBLICATIONS

Aug. 31, 2016—(CN)—First Office Action Appn 201410371517.1 with English Tran.

(Continued)

*Primary Examiner* — Pegeman Karimi
(74) *Attorney, Agent, or Firm* — Banner & Witcoff, Ltd.

(57) ABSTRACT

Disclosed are a touch display panel and a display device. The touch display panel includes common electrodes, pixel electrodes, a processing module, at least one first magnetic sensing electrode and at least one second magnetic sensing electrode. The at least one first magnetic sensing electrode is disposed on the same layer as the common electrodes and configured to sense magnetic field variation in a first direction (X) and generate corresponding magnetic sensing signals; and the at least one second magnetic sensing electrode is disposed on the same layer as the pixel electrodes and configured to sense magnetic field variation in a second direction (Y) and generate corresponding magnetic sensing signals. An angle between the first direction (X) and the (Continued)

second direction (Y) is a non-zero angle. The processing module is configured to generate touch signals according to the magnetic sensing signals.

15 Claims, 3 Drawing Sheets

(56) References Cited

U.S. PATENT DOCUMENTS

2015/0091849 A1* 4/2015 Ludden ................. G06F 3/0412
  345/174
2015/0277633 A1* 10/2015 Jiang ....................... G06F 3/046
  345/174

FOREIGN PATENT DOCUMENTS

| CN | 103927071 A | 7/2014 |
| CN | 103927072 A | 7/2014 |
| WO | 2010145492 A1 | 12/2010 |

OTHER PUBLICATIONS

Apr. 21, 2015—International Search Report and Written Opinion Appn PCT/CN2014/088703 with Eng Tran.

* cited by examiner

IN-CELL ELECTROMAGNETIC TOUCH DISPLAY PANEL AND DISPLAY DEVICE

The application is a U.S. National Phase Entry of International Application No. PCT/CN2014/088703 filed on Oct. 16, 2014, designating the United States of America and claiming priority to Chinese Patent Application No. 201410371517.1 filed on Jul. 30, 2014. The present application claims priority to and the benefit of the above-identified applications and the above-identified applications are incorporated by reference herein in their entirety.

TECHNICAL FIELD

Embodiments of the present invention relate to a touch display panel and a display device.

BACKGROUND

For portable reading devices, portable office equipments, etc., traditional capacitive touch display panels cannot satisfy users' primary demand for touch display panels due to their failure to implement highly accurate edit input because of their low accuracy of capacitive touch and incapability of insertion editing between characters.

Electromagnetic touch is a high accuracy edit input mode. Degree of light weight and thin profile of display devices are increased continuously, which makes it difficult to integrate electromagnetic touch into display devices, since the integration method for electromagnetic touch needs to add a layer of electromagnetic touch plate on the display panel to cooperate with an active electromagnetic pen for implementing electromagnetic touch. However, such an out-cell pattern not only impacts flatness of the entire device, but also directly increases the thickness of the entire display device, which prevents display device's development for realizing thin profile and light weight.

SUMMARY

At least one embodiment of the present invention provides a touch display panel and a display device that can integrate electromagnetic touch function into a touch display panel in an in-cell form and involve high precision of edit input and light and thin entire display device.

At least one embodiment of the present invention provides a touch display panel including common electrodes, pixel electrodes, a processing module, at least one first magnetic sensing electrode and at least one second magnetic sensing electrode. The at least one first magnetic sensing electrode is disposed on a same layer as the common electrodes and configured to sense magnetic field variation in a first direction and generate corresponding magnetic sensing signals; and the at least one second magnetic sensing electrode is disposed on a same layer as the pixel electrodes and configured to sense magnetic field variation in a second direction and generate corresponding magnetic sensing signals. An angle between the first direction and the second direction is a non-zero angle. The processing module is electrically connected with the at least one first magnetic sensing electrode and the at least one second magnetic sensing electrode respectively. The processing module is configured to generate touch signals according to the magnetic sensing signals.

At least one embodiment of the present invention provides a display device including a display panel, wherein the display panel includes the above-mentioned touch display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions in the embodiments will be described in a clearly and fully understandable way in connection with the drawings in the embodiments of the invention. Based on the embodiments in the present invention, all other embodiments obtained by those of ordinary skill in the art without any inventive work should be within the scope of the invention.

Figure 1:
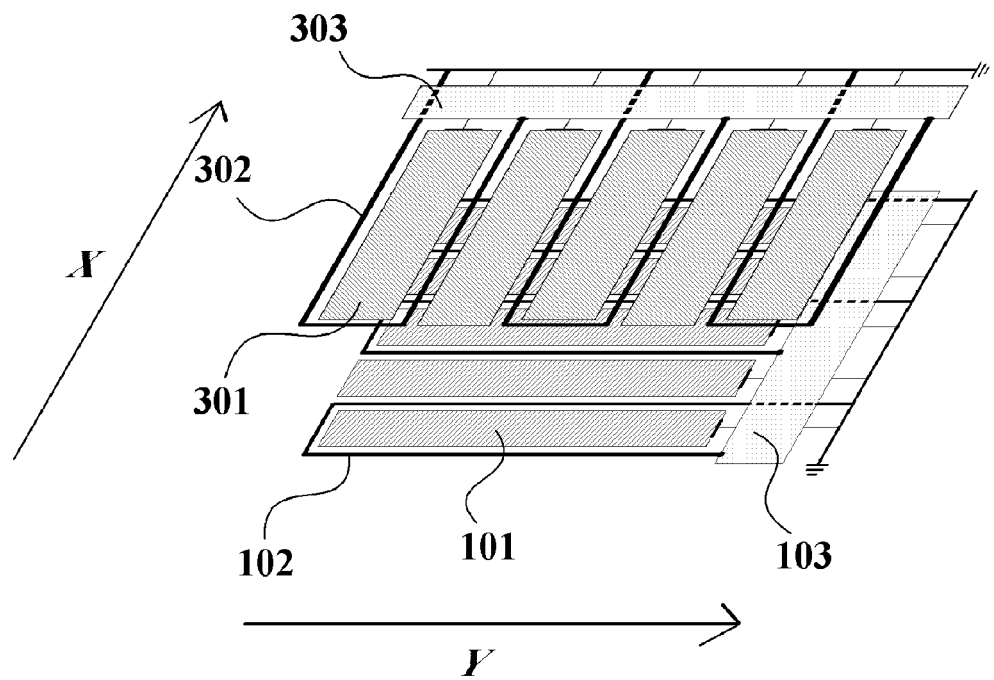
FIG. 1 is a structure diagram of a touch display panel in an embodiment of the present invention.

At least one embodiment of the present invention provides a touch display panel. Referring to FIG. 1, the touch display panel includes common electrodes 101 and pixel electrodes 301, and further includes processing modules (processing modules 103 and 303), at least one first magnetic sensing electrode 102 and at least one second magnetic sensing electrode 302.

The at least one first magnetic sensing electrode 102 is disposed in the same layer as the common electrodes 101 to sense magnetic field variation in a first direction X and generate corresponding magnetic sensing signals; and the at least one second magnetic sensing electrode 302 is disposed in the same layer as the pixel electrodes 301 to sense magnetic field variation in a second direction Y and generate corresponding magnetic sensing signals.

The angle between the first direction X and the second direction Y is a non-zero angle that may be generally 90° for the consistency of overall display device and convenience of manufacturing process.

The processing modules 103 and 303 are electrically connected with the at least one first magnetic sensing electrode 102 and the at least one second magnetic sensing electrode 302 respectively to generate touch signals according to the magnetic sensing signals. Reference numerals 103 and 303 represent that processing modules correspond to different parts of different magnetic sensing electrodes. Of course, the processing modules may further include structures not shown in figures.

In at least one embodiment of the present invention, the touch signals may include position information and/or motion state information of an external magnetic field generation equipment relative to the touch display panel, while the above-mentioned processing modules correspond to a processing unit for calculating touch positions according to magnetic sensing signals in the electromagnetic touch device, and may be implemented with for example integrated circuits.

It is to be noted that the shape of the above-mentioned structure (including common electrodes 101, the first magnetic sensing electrode 102, pixel electrodes 301 and the second magnetic sensing electrode 302) and the relative position relationship between the first direction X and the second direction Y in FIG. 1 are only examples, and do not limit the technical proposal in embodiments of the present invention.

Figure 2:
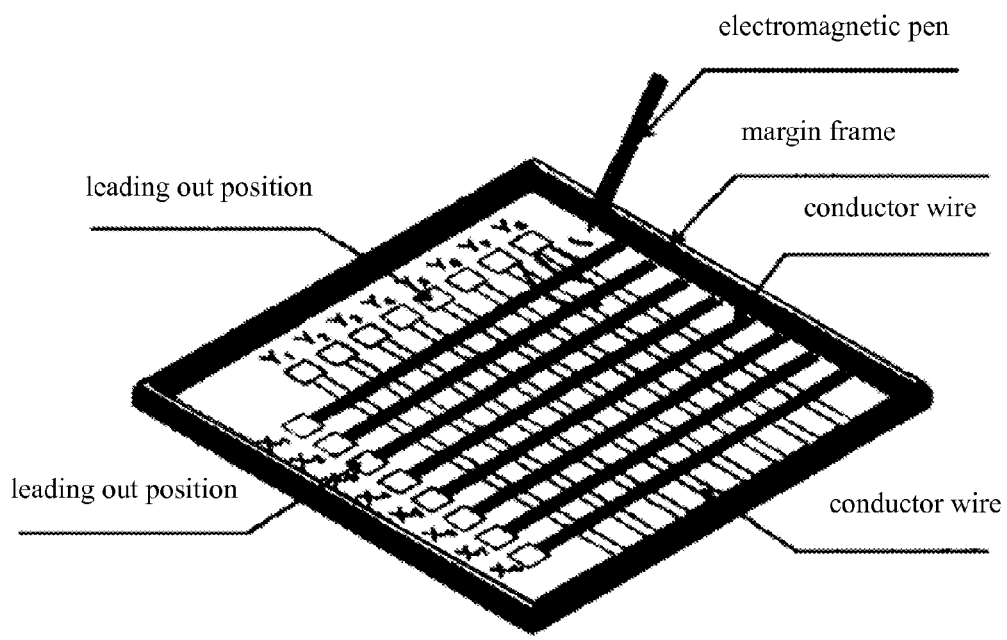
FIG. 2 is a schematic diagram of out-cell electromagnetic touch.

Referring to FIG. 2, the operation principle for the electromagnetic touch device mentioned in at least one embodiment of the present invention is described as follows. An electromagnetic pen forms a relatively steady magnetic field around itself. When it moves near a conductor wire, the conductor wire will experience relative motion that cuts magnetic lines, thereby generating an induced electromotive force at two ends of the wire. If the conductor wire is in a loop, induced current occurs. According to this principle, it is possible to find out the conductor wire that generates the induced electromotive force or induced current and measure the magnitudes of induced electromotive force or induced current at the leading-out position shown in figure, thereby extracting therefrom the information about the position of electromagnetic pen and the moving trajectory, that is, the handwriting information of the electromagnetic pen.

Corresponding to the above-mentioned conductor wire, in at least one embodiment of the present invention, for example, a conductor loop (shaping the conductor wire as U and connecting both ends thereof at a certain point in the circuit) is used to form the first magnetic sensing electrode 102 and the second magnetic sensing electrode 302. The above-mentioned structure allows disposing a part of the circuit that is connected with the magnetic sensing electrodes on one side of the display area, thereby saving pace and simplifying design process. Of course, electromagnetic touch may be equally implemented with the conductor wire shown in FIG. 2 or a conductor wire of other shapes, which is not limited in embodiments of the present invention.

It can be seen that in at least one embodiment of the present invention, two conductor wire sets for sensing magnetic field variation in two different directions in the electromagnetic touch are divided into a first magnetic sensing electrode 102 and a second magnetic sensing electrode 302 and disposed in the same layer as common electrodes 101 and pixel electrodes 301 respectively. At the same time, corresponding processing modules 103 and 303 are used to process magnetic sensing signals into touch signals. The touch signals include position information and/or motion state information of an external magnetic field generating equipment such as an active electromagnetic pen relative to the touch display panel. Therefore, with the above-mentioned structure, embodiments of the present invention realize in-cell electromagnetic touch function of the touch display panel.

Based on the above-mentioned structure, as compared to the design in which the electromagnetic touch panel as shown in FIG. 2 is disposed on the display panel, the embodiments of the present invention can not only realize all functions of electromagnetic touch, but also avoid out-cell arrangement of electromagnetic touch panel, thereby allowing a lighter and thinner display device in entirety. That is, the embodiments of the present invention address both the high precision of edit input and the light and thin entire display device at the same time.

Figure 3:
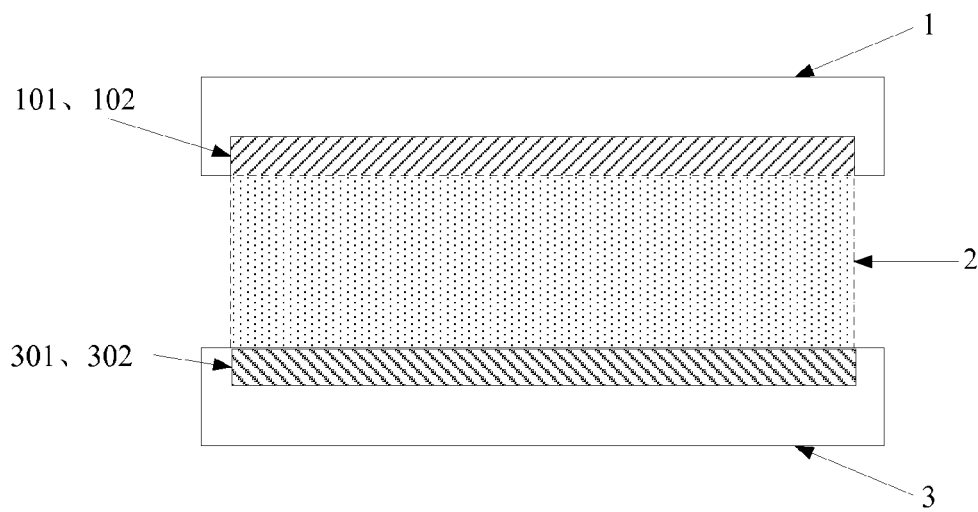
FIG. 3 is a sectional structure diagram of the liquid crystal touch display panel in an embodiment of the present invention.

Further, the touch display panel may work with liquid crystal display principle. As an example, a liquid crystal touch display panel will be illustrated below. Referring to FIG. 3, on the basis of the above-described touch display panel, the liquid crystal touch display panel includes a color filter substrate 1, a liquid crystal layer 2 and an array substrate 3; the color filter substrate 1 is provided with common electrodes 101 thereon and is provided with the first magnetic sensing electrode 102 on the same layer; and the array substrate 3 is formed with pixel electrodes 301 and is provided with a second magnetic sensing electrode 302 on the same layer (reference numerals consistent with those in FIG. 1). The color filter substrate is one kind of opposed substrates; and when the array substrate is provided with a color filter structure thereon, a color filter structure needs not to be disposed on the opposed substrate.

It is to be noted that embodiments of the present invention focus on how to integrate components necessary for implementing electromagnetic touch into the display panel, and does not necessarily have connection with other components for implementing electromagnetic touch and display panel, which however can be selected from known technology in practicing the embodiments of the present invention.

Figure 4:
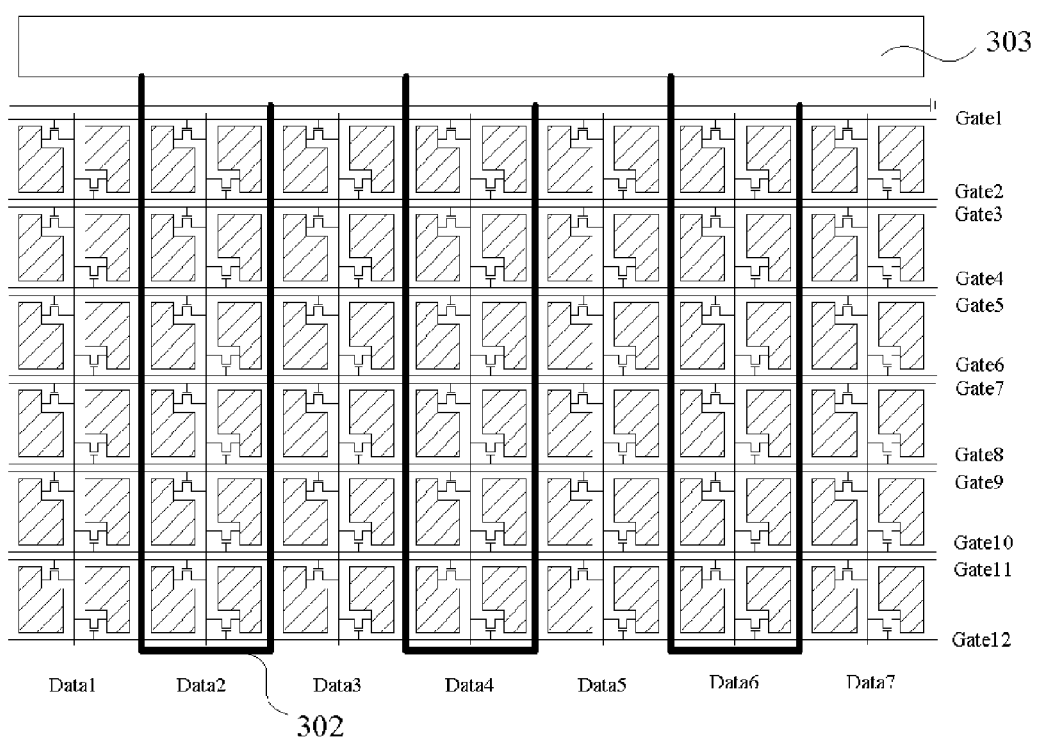
FIG. 4 is a structure diagram of second magnetic sensing electrodes disposed in the same layer as pixel electrodes in the array substrate and a second processing module in an embodiment of the present invention.

The magnetic sensing electrodes may be a number of separate conductor wires as shown in FIG. 2, or a number of conductor wire loops as shown in FIG. 4. FIG. 4 shows specifically structures of a second magnetic sensing electrode 302 and a processing module 303 disposed on the same layer as pixel electrodes 301 in an array substrate 3. In the figure, the black bold line represents the second magnetic sensing electrode 302.

Here, the pixel electrode includes a plurality of sub-pixel electrodes located in a plurality of pixel units arranged in rows and columns. The shadow regions in FIG. 4 represent sub-pixel electrodes in pixel units.

For example, the at least one second magnetic sensing electrode 302 is at least one U-shaped strip electrode arranged parallel to each other in the second direction Y; and two ends of the second magnetic sensing electrode 302 are electrically connected with a second common end and the processing module 303 respectively. It is to be noted that here, because the second magnetic sensing electrode 302 is configured to sense magnetic field variation in the second direction Y, it is known from the electromagnetic induction principle that each second magnetic sensing electrode 302 should extend in a direction perpendicular to the second direction Y, and therefore the arrangement direction of a plurality of second magnetic sensing electrodes 302 should be the second direction Y also. With such a shape, on one hand, it is possible to have the second magnetic sensing electrodes 302 to cover the entire display panel uniformly and function to sense external magnetic field, and on the other hand facilitate arrangement to be comparable with a known design of a display panel.

Also, in at least one embodiment of the present invention, the processing module 303 includes a second data selector electrically connected with the at least one second magnetic sensing electrode and configured to output second touch signals according to the magnetic sensing signals input by the second magnetic sensing electrode, in which the second touch signals contain position information of the second magnetic sensing electrodes that is induced by the magnetic field variation in the second direction. The data selector MUX may be used to convert magnetic sensing signals directly into identification of a magnetic sensing electrode representing the touch position, and in turn implement electromagnetic touch function of the touch display panel.

Furthermore, at least one row or at least one column of pixel units are disposed inside the U shape of the at least one second magnetic sensing electrode, and at least one row or at least one column of pixel units are disposed between adjacent two second magnetic sensing electrodes. Here, the arrangement of the second magnetic sensing electrodes among the array of pixel units may further take full advantage of space, and at the same time will not impose significant impact on the function of pixel units.

Still further, a proceeding gate line and a following gate line are disposed corresponding to each row of pixel units in the touch display panel, and two adjacent pixel units in a same row are electrically connected with one of these two gate lines respectively. In the touch display panel, a data line is disposed between the 2N–1$^{th}$ column of pixel units and the 2N$^{th}$ column of pixel units, and the 2N–1$^{th}$ column of pixel units and the 2N$^{th}$ column of pixel units are both electrically connected with the same one data line, where N is an arbitrary positive integer. Two columns of pixel units electrically connected with a same data line are disposed inside the U shape of the at least one second magnetic sensing electrode. Two columns of pixel units electrically connected with a same data line are disposed between adjacent two second magnetic sensing electrodes.

Alternatively, a left gate line and a right gate line are disposed corresponding to each column of pixel units in the touch display panel, and two adjacent pixel units in a same column are electrically connected with one of these two gate lines. In the touch display panel, a data line is disposed between the 2N–1$^t$ row of pixel units and the 2N$^{th}$ row of pixel units, and the 2N–1$^{th}$ row of pixel units and the 2N$^{th}$ row of pixel units are both electrically connected with the same one data line, where N is an arbitrary positive integer. Two rows of pixel units electrically connected with a same data line are disposed inside the U shape of the at least one second magnetic sensing electrode. Two rows of pixel units electrically connected with a same data line are disposed between adjacent two second magnetic sensing electrodes.

The above-mentioned dual-gate design can save some space for disposing gate lines and data lines for arranging the second magnetic sensing electrodes 302.

Figure 5:
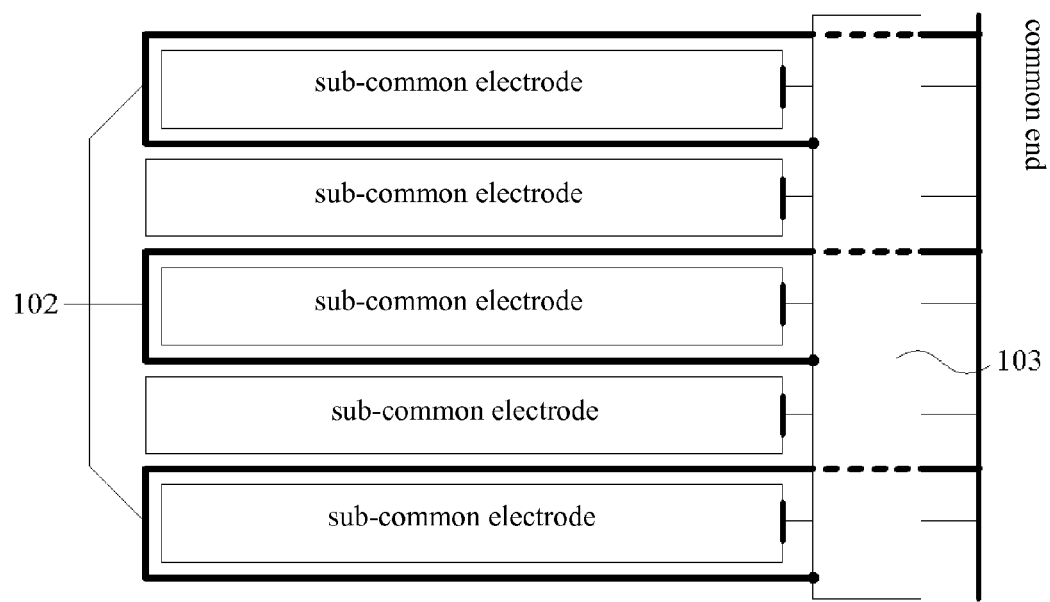
FIG. 5 is a structure diagram of first magnetic sensing electrodes disposed in the same layer as common electrodes in the color filter substrate and a first processing module in an embodiment of the present invention.

Referring to FIG. 5 which shows a structure in which first magnetic sensing electrodes 102 and a processing module 103 disposed on the same layer as common electrodes 101 in a color filter substrate 1. Similarly, the black bold lines in the figure represent the first magnetic sensing electrodes 102.

For example, the at least one first magnetic sensing electrode 102 is at least one U-shaped strip electrode arranged parallel to each other in the first direction X; and two ends of the first magnetic sensing electrode 102 are electrically connected with a first common end and the processing module 103 respectively. With such a shape, on one hand, it is possible to have the first magnetic sensing electrodes 102 to "cover" the entire display panel uniformly and function to sense an external magnetic field, and at the same time make the arrangement comparable with a known design of display panel.

The first common end and the second common end both represent zero potential points in the circuit which may be the same one point or include a plurality of points.

At the same time, in at least one embodiment of the present invention, the processing module 103 includes a first data selector electrically connected with the at least one first magnetic sensing electrode and configured to output first touch signals according to the magnetic sensing signals input by the first magnetic sensing electrode, in which the first touch signals contain position information of the first magnetic sensing electrode that is induced by the magnetic field variation in the first direction. A data selector MUX may be used to convert magnetic sensing signals directly into serial number of a magnetic sensing electrode representing the touch position, and in turn implement electromagnetic touch function of the touch display panel.

Figure 6:
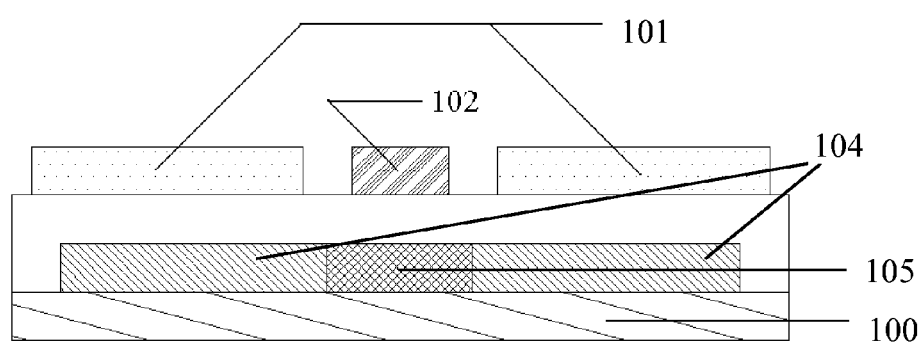
FIG. 6 is a sectional structure diagram of a color filter substrate provided with second magnetic sensing electrodes in an embodiment of the present invention.

Further, the at least one first magnetic sensing electrode divides the common electrodes into a plurality of sub-common electrodes that are located inside the U shape of the first magnetic sensing electrode or between two adjacent first magnetic sensing electrodes. Even further, the touch display panel further includes a black matrix layer in which a black matrix pattern corresponding to the area for forming the at least one first magnetic sensing electrode is formed. Referring to FIG. 6, on the glass substrate 100 are formed color filter units 104 and a black matrix 105, at positions corresponding to which on an upper layer sub-common electrodes 101 and the first magnetic sensing electrode 102 are disposed. Here, because the areas in the common electrode layer that correspond to the position of black matrix need not to be provided with common electrodes, common electrodes in these areas can be removed for arranging first magnetic sensing electrodes 102 there. Such a design avoids need of an independent layer of circuit board, and is in favor of a light weight and thin profile display device.

In addition, in at least one embodiment of the present invention, in order not to impact the function of original display panel, the first magnetic sensing electrode and the common electrodes are insulated from each other without any electrical connection therebetween; and the second magnetic sensing electrode and the pixel electrodes are insulated from each other without any electrical connection therebetween.

Of course, the above-mentioned liquid crystal touch display panel is only an example. The touch display panel proposed in embodiments of the present invention may be a TN (twisted nematic) type liquid crystal display panel, or an ECB (electrically controlled birefringence) type liquid crystal display panel; and at the same time, it may be a reflective touch display panel (accordingly with magnetic sensing electrodes formed of a metallic material), a transmissive touch display panel (accordingly with magnetic sensing electrodes formed of indium tin oxide (ITO)), or a transflective touch display panel, or other types of display panels such as an OLED panel.

At least one embodiment of the present invention provides a display device including a display panel that may be any of the touch display panels described in embodiment 1. The display device may be any product or component with display function such as a liquid crystal panel, a piece of electronic paper, an OLED panel, a cellphone, a tab computer, a TV set, a display, a notebook computer, a digital picture frame, a navigator, and a watch.

Because the display device provided in embodiments of the present invention has the same technical features as the above-mentioned touch display panel, it can address the same technical problems and realize the same technical effects.

In summary, in embodiments of the present invention, first of all, two conductor wire sets for sensing magnetic field variation in two different directions in the electromagnetic touch are divided into first magnetic sensing electrodes and second magnetic sensing electrodes and disposed in the same layer as common electrodes and pixel electrodes respectively. At the same time, corresponding processing modules are used to process magnetic sensing signals into touch signals, and the touch signals include position information and/or motion state information of an external magnetic field generating equipment such as electromagnetic pen) relative to the touch display panel. Therefore, with the above-mentioned structure, at least one embodiment of the present invention realize in-cell electromagnetic touch function of the touch display panel.

At least one embodiment of the present invention can not only implement all functions of electromagnetic touch, but also avoid arrangement of an external electromagnetic touch panel, thereby allowing for lighter and thinner display device, and allowing for edit input and a light weight and thin profile display device at the same time.

It is to be noted that relation terms herein such as first and second are just used to distinguish one entity or operation from the other entity or operation rather than necessarily requiring or implying any such practical relation or order between these entities or operations. Furthermore, terms "include", "including", "contain", "containing" or any other their variants are intended to mean non-exclusive inclusion, such that a process, a method, an article or an equipment including a series of elements not only include those elements, but also includes other elements not listed explicitly or includes intrinsic elements for these processes, methods, articles or equipments. Without more limitations, elements defined by the expression "includes one . . . " does not exclude that a process, a method, an article or an equipment including the elements further includes additional same elements.

What are described above is related to the illustrative embodiments of the disclosure only and not limitative to the scope of the disclosure; the scopes of the disclosure are defined by the accompanying claims.

The present application claims priority of China Patent application No. 201410371517.1 filed on Jul. 30, 2014, the content of which is incorporated in its entirety as part of the present application by reference herein.

The invention claimed is:

1. A touch display panel comprising common electrodes, pixel electrodes, a processing module, at least one first magnetic sensing electrode and at least one second magnetic sensing electrode;
   wherein the at least one first magnetic sensing electrode is disposed on a same layer as the common electrodes and configured to sense magnetic field variation in a first direction and generate corresponding magnetic sensing signals; and the at least one second magnetic sensing electrode is disposed on a same layer as the pixel electrodes and configured to sense magnetic field variation in a second direction and generate corresponding magnetic sensing signals;
   an angle between the first direction and the second direction is a non-zero angle;
   the processing module is electrically connected with the at least one first magnetic sensing electrode and the at least one second magnetic sensing electrode respectively; and
   the processing module is configured to calculate touch positions according to the magnetic sensing signals so as to generate touch signals, wherein
   the at least one first magnetic sensing electrode is at least one U-shaped strip electrode arranged parallel to each other in the first direction,
   the common electrodes include a plurality of sub-common electrodes separated by the at least one first magnetic sensing electrode such that the sub-common electrodes are located inside the U shape of the first magnetic sensing electrode or, if there are a plurality of first magnetic sensing electrodes, between two adjacent first magnetic sensing electrodes.

2. The touch display panel of claim 1, wherein two ends of the first magnetic sensing electrode are electrically connected with a first common end and the processing module respectively; and
   the at least one second magnetic sensing electrode is at least one U-shaped strip electrode arranged parallel to each other in the second direction; and two ends of the second magnetic sensing electrode are electrically connected with a second common end and the processing module respectively.

3. The touch display panel of claim 2, wherein the pixel electrodes comprise a plurality of sub-pixel electrodes located in a plurality of pixel units arranged in rows and columns; and
   at least one row or at least one column of pixel units are disposed inside the U shape of the at least one second magnetic sensing electrode, and at least one row or, if there are a plurality of second magnetic sensing electrodes, at least one column of pixel units is disposed between adjacent two second magnetic sensing electrodes.

4. The touch display panel of claim 3, wherein a proceeding gate line and a following gate line are disposed corresponding to each row of pixel units in the touch display panel, and two adjacent pixel units in a same row are electrically connected with one of these two gate lines;
   in the touch display panel, a data line is disposed between a $2N-1^{th}$ column of pixel units and a $2N^{th}$ column of pixel units, and the $2N-1^{th}$ column of pixel units and the $2N^{th}$ column of pixel units are electrically connected with a same one data line, where N is an arbitrary positive integer;
   two columns of pixel units electrically connected with a same data line are disposed inside the U shape of the at least one second magnetic sensing electrode; and two columns of pixel units electrically connected with a same data line are disposed between adjacent two second magnetic sensing electrodes.

5. The touch display panel of claim 3, wherein two gate lines are disposed corresponding to each column of pixel units in the touch display panel, and two adjacent pixel units in a same column are electrically connected with one of these two gate lines respectively;
   in the touch display panel, a data line is disposed between a $2N-1^{th}$ row of pixel units and a $2N^{th}$ row of pixel units, and the $2N-1^{th}$ row of pixel units and the $2N^{th}$ row of pixel units are electrically connected with the same one data line, where N is an arbitrary positive integer; and two rows of pixel units electrically connected with a same data line are disposed inside the U shape of the at least one second magnetic sensing electrode; two rows of pixel units electrically connected with a same data line are disposed between adjacent two second magnetic sensing electrodes.

6. The touch display panel of claim 3, wherein the first magnetic sensing electrode and the common electrodes are insulated from each other; and the second magnetic sensing electrode and the pixel electrodes are insulated from each other.

7. The touch display panel of claim 3, wherein the processing module comprises a first data selector and a second data selector;
   the first data selector and the at least one first magnetic sensing electrode are electrically connected to output first touch signals according to the magnetic sensing signals input by the first magnetic sensing electrode, and the first touch signals comprise position information of the first magnetic sensing electrode induced by the magnetic field variation in the first direction; and
   the second data selector and the at least one second magnetic sensing electrode are electrically connected to output second touch signals according to the magnetic sensing signals input by the second magnetic sensing electrode, and the second touch signals comprise position information of the second magnetic sensing electrode induced by the magnetic field variation in the second direction.

8. The touch display panel of claim 2, wherein the first magnetic sensing electrode and the common electrodes are insulated from each other; and the second magnetic sensing electrode and the pixel electrodes are insulated from each other.

9. The touch display panel of claim 2, wherein the processing module comprises a first data selector and a second data selector;
   the first data selector and the at least one first magnetic sensing electrode are electrically connected to output first touch signals according to the magnetic sensing signals input by the first magnetic sensing electrode, and the first touch signals comprise position information of the first magnetic sensing electrode induced by the magnetic field variation in the first direction; and
   the second data selector and the at least one second magnetic sensing electrode are electrically connected to output second touch signals according to the magnetic sensing signals input by the second magnetic sensing electrode, and the second touch signals comprise position information of the second magnetic sensing electrode induced by the magnetic field variation in the second direction.

10. The touch display panel of claim 1, further comprising a black matrix layer in which a black matrix pattern corresponding to an area for forming the at least one first magnetic sensing electrode is formed.

11. The touch display panel of claim 1, wherein the first magnetic sensing electrode and the common electrodes are insulated from each other; and the second magnetic sensing electrode and the pixel electrodes are insulated from each other.

12. The touch display panel of claim 1, wherein the processing module comprises a first data selector and a second data selector;
   the first data selector and the at least one first magnetic sensing electrode are electrically connected to output first touch signals according to the magnetic sensing signals input by the first magnetic sensing electrode, and the first touch signals comprise position information of the first magnetic sensing electrode induced by the magnetic field variation in the first direction; and
   the second data selector and the at least one second magnetic sensing electrode are electrically connected to output second touch signals according to the magnetic sensing signals input by the second magnetic sensing electrode, and the second touch signals comprise position information of the second magnetic sensing electrode induced by the magnetic field variation in the second direction.

13. A display device comprising a display panel, wherein the display panel is the touch display panel according to claim 1.

14. The touch display panel of claim 1, wherein the first magnetic sensing electrode and the common electrodes are insulated from each other; and the second magnetic sensing electrode and the pixel electrodes are insulated from each other.

15. The touch display panel of claim 1, wherein the processing module comprises a first data selector and a second data selector;
   the first data selector and the at least one first magnetic sensing electrode are electrically connected to output first touch signals according to the magnetic sensing signals input by the first magnetic sensing electrode, and the first touch signals comprise position information of the first magnetic sensing electrode induced by the magnetic field variation in the first direction; and
   the second data selector and the at least one second magnetic sensing electrode are electrically connected to output second touch signals according to the magnetic sensing signals input by the second magnetic sensing electrode, and the second touch signals comprise position information of the second magnetic sensing electrode induced by the magnetic field variation in the second direction.

* * * * *